(12) United States Patent
Nakamura (10) Patent No.: US 8,990,545 B2
(45) Date of Patent: Mar. 24, 2015

(54) METHOD, SYSTEM, AND COMPUTER PROGRAM FOR ANALYZING PROGRAM

(75) Inventor: Kenta Nakamura, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 570 days.

(21) Appl. No.: 13/332,436

(22) Filed: Dec. 21, 2011

(65) Prior Publication Data

US 2012/0166776 A1 Jun. 28, 2012

(30) Foreign Application Priority Data

Dec. 27, 2010 (JP) ................................. 2010-290894

(51) Int. Cl.
*G06F 11/34* (2006.01)

(52) U.S. Cl.
CPC ............ *G06F 11/34* (2013.01); *G06F 11/3466* (2013.01)
USPC ........................................................ 712/240

(58) Field of Classification Search
CPC combination set(s) only.
See application file for complete search history.

(56) References Cited

U.S. PATENT DOCUMENTS

| | | | | |
|---|---|---|---|---|
| 5,437,048 | A * | 7/1995 | Morita et al. .................. | 709/208 |
| 6,233,678 | B1 * | 5/2001 | Bala .............................. | 712/240 |
| 6,269,438 | B1 * | 7/2001 | Chang ........................... | 712/233 |
| 6,653,701 | B1 | 11/2003 | Yamazaki et al. | |
| 6,986,027 | B2 * | 1/2006 | Barowski et al. ............. | 712/240 |
| 7,353,505 | B2 * | 4/2008 | O'Dowd ........................ | 717/158 |
| 8,566,569 | B2 * | 10/2013 | Bonanno et al. ............... | 712/240 |
| 2004/0225870 | A1 * | 11/2004 | Srinivasan et al. ............ | 712/235 |
| 2006/0015706 | A1 * | 1/2006 | Lai ................................. | 712/239 |
| 2007/0272558 | A1 | 11/2007 | Aksu et al. | |
| 2008/0217687 | A1 | 9/2008 | Tsou | |
| 2009/0130796 | A1 | 5/2009 | Taunier et al. | |
| 2010/0169626 | A1 * | 7/2010 | Wang et al. ................... | 712/239 |
| 2011/0094583 | A1 | 4/2011 | Voss et al. | |
| 2013/0270117 | A1 | 10/2013 | Szocs et al. | |

FOREIGN PATENT DOCUMENTS

| | | | |
|---|---|---|---|
| JP | 5693889 | A1 | 7/1981 |
| JP | 0613070 | A1 | 5/1994 |
| JP | 09244892 | A1 | 9/1997 |
| JP | 11282677 | A1 | 10/1999 |
| JP | 2000293373 | A1 | 10/2000 |
| JP | 2001243069 | A1 | 9/2001 |
| JP | 2006053830 | A1 | 2/2003 |
| JP | 2004124865 | A1 | 4/2004 |
| JP | 2004326785 | A1 | 11/2004 |

* cited by examiner

*Primary Examiner* — Eric Coleman
(74) *Attorney, Agent, or Firm* — Steven M. Kellner; David Cain (57) ABSTRACT

This is a program analysis technique using a branch history table (BHT). Upon start of a program, a plurality of flags, each corresponding to an instruction of the program, are initialized to a disabled state and an initial state of a BHT is stored. Upon execution of a branch instruction, if a branch has not been taken, a value of history information of a corresponding entry of the BHT is decremented. If the branch has been taken, the value of the history information of the corresponding entry is incremented and whether a corresponding flag is enabled or disabled is determined. If the corresponding flag is disabled, the flag is enabled. Upon termination of the program, a differential history information value of each entry is obtained from the stored initial state and a final state of the BHT. A final state of each flag is obtained.

16 Claims, 13 Drawing Sheets

METHOD, SYSTEM, AND COMPUTER PROGRAM FOR ANALYZING PROGRAM

TECHNICAL FIELD

The present invention relates to analysis of a program, and, more particularly, to a method, a system, and a computer program for performing analysis of a program using a table, such as a branch history table (hereinafter, abbreviated as "BHT").

BACKGROUND ART

In development and optimization of a program, it is important to know behavior of the program in detail. As analysis techniques used for knowing behavior of a program, techniques such as a CPU emulator, a software profiler, and a hardware profiler are available. In the CPU-emulator technique, a program is executed on a software CPU emulator. The CPU-emulator technique can provide every piece of information including an internal state of a processor but has low execution speed and cannot reproduce a real use environment of embedded devices. In the software-profile technique, instructions for analysis are inserted when a program is compiled. The software-profile technique measures the execution order, the number of times of execution, and the execution time in units of functions but the instructions for analysis greatly affect behavior of the program. The hardware-profiler technique is implemented in a CPU and hardware for analysis is added to a bus or a dedicated interface of the CPU. The analysis performance of the hardware-profiler technique depends on implementation and the hardware-profiler technique works only when the hardware for analysis is implemented.

PTL 1 discloses a technique in which both BHT-based branch prediction and non-BHT-based branch prediction (static branch prediction) are used. The BHT is not updated when an outcome can be statically predicted, whereby the technique prevents unnecessary rewriting of a value of the BHT from decreasing the accuracy of branch instruction prediction that requires the BHT.

PTL 2 discloses a branch prediction apparatus including a branch prediction table, a prediction output unit, and a counter control unit. The branch prediction table holds, for each branch instruction, a one-bit history bit and a two-bit counter. When a value of the counter is equal to zero or two, the prediction output unit outputs a value of the history bit. When the value of the counter is equal to one or three, the prediction output unit inverts the value of the history bit before outputting it. The counter control unit compares a branch result with the value of the history bit. If the branch result matches the value of the history bit, the counter control unit sets the value of the counter to zero. If the branch result does not match the value of the history bit and the value of the counter is not equal to three, the counter control unit increases the value of the counter by one. With the configuration, the branch prediction apparatus correctly predicts, using a few hardware components, a pattern in which "branch taken" and "branch not taken" alternately continue.

CITATION LIST

Patent Literature

[PTL 1] Japanese Unexamined Patent Application Publication No. 11-282677

[PTL 2] Japanese Unexamined Patent Application Publication No. 2000-293373

SUMMARY OF INVENTION

Technical Problem

The existing program analysis techniques are not necessarily satisfactory and each technique has a problem. Particularly, detailed analysis of behavior of software is important in optimization of embedded systems. However, the CPU-emulator technique cannot reproduce a real use environment of embedded devices and, thus, is not suitable for programs of the embedded systems. With the software-profile technique, program analysis is performed in units of functions or in coarser units and modification of software is also involved. The hardware-profiler technique is not available unless a hardware profiler is implemented in a CPU.

An object of the present invention is to realize a program analysis technique that solves the problems of the existing techniques. The object of the present invention includes providing a method, a system, and a computer program for analyzing a program using a table, such as a BHT.

Solution to Problem

According to one embodiment of the present invention, a method for analyzing a program includes the following steps, executed by a processor, of: initializing, upon start of the program, a plurality of flags included in a first table to a disabled state, each of the plurality of flags corresponding to an instruction of the program; storing, upon start of the program, an initial state of a second table that includes a plurality of entries each corresponding to an instruction of the program and that holds history information in each of the plurality of entries; determining, upon execution of a branch instruction, whether or not a branch has been taken; decrementing, when the branch has not been taken, a value of the history information of a corresponding entry of the second table; incrementing, when the branch has been taken, a value of the history information of a corresponding entry of the second table; determining whether a corresponding flag of the first table is enabled or disabled; enabling, when the corresponding flag is disabled, the corresponding flag; determining whether or not to terminate the program; repeating, when the program is not terminated, the step of determining whether or not a branch has been taken to the step of determining whether or not to terminate the program; obtaining, when the program is terminated, a differential history information value of each entry between the stored initial state and a final state of the second table; and obtaining, when the program is terminated, a final state of each flag of the first table.

Preferably, the flag may be a flag bit. The step of initializing the plurality of flags to the disabled state may include setting the flag bit to zero, whereas the step of enabling the corresponding flag may include setting the flag bit to one. Additionally, preferably, the history information may be composed of a plurality of bits and the second table may function as the first table by using a least significant bit of the plurality of bits as the flag. The step of initializing the plurality of flags to the disabled state may include setting the least significant bit to zero, whereas the step of enabling the corresponding flag may include setting the least significant bit to one. Further, preferably, a branch history table may be used as the second table.

According to one embodiment of the present invention, there is provided a computer program for analyzing a program. The computer program causes a processor to execute each step of the foregoing methods.

According to one embodiment of the present invention, there is provided a system for analyzing a program including a processor. The processor includes a first table that includes a plurality of flags each corresponding to an instruction of the program, a first table control unit that controls the first table, a second table that includes a plurality of entries each corresponding to an instruction of the program and that holds history information in each of the plurality of entries, a second table control unit that controls the second table, and a branch processing unit that processes a branch instruction and that supplies the first table control unit and the second table control unit with information about whether or not a branch has been taken. The first table control unit includes a flag processor that initializes, upon start of the program, the plurality of flags to a disabled state, that determines, upon being supplied with information indicating that the branch has been taken from the branch processing unit, whether a corresponding flag is enabled or disabled, that enables, when the corresponding flag is disabled, the corresponding flag, and that supplies, upon termination of the program, the processor with a final state of each flag of the first table. The second table control unit includes a history information processor that stores, upon start of the program, an initial state of the history information of each entry, that decrements, upon being supplied with information indicating that the branch has not been taken from the branch processing unit, a value of the history information of a corresponding entry, that increments, upon being supplied with information indicating that the branch has been taken from the branch processing unit, a value of the history information of a corresponding entry, and that supplies, upon termination of the program, the processor with a differential history information value of each entry between the stored initial state and a final state of the history information of the entry.

Preferably, the flag may be a flag bit. The flag processor may initialize the flag to the disabled state by setting the flag bit to zero and may enable the flag by setting the flag bit to one. Additionally, preferably, the history information may be composed of a plurality of bits. The second table may function as the first table by using a least significant bit of the plurality of bits as the flag. The history information processor may initialize the flag to the disabled state by setting the least significant bit to zero and may enable the flag by setting the least significant bit to one. Further, preferably, the second table may include a branch history table.

Advantageous Effects of Invention

The present invention realizes a program analysis technique that solves the problems of the existing program analysis techniques and provides a method, a system, and a computer program for analyzing a program using a table, such as a BHT. In particular, by using a table, such as a BHT, implemented in a processor, the present invention can achieve a program analysis technique that offers low hardware cost, applies a less influence on the program and provides high speed in units of basic blocks which are more fine-grained than in units of functions.

DESCRIPTION OF EMBODIMENTS

The best mode for carrying out the present invention will be described in detail below based on the drawings. Following Embodiments are not intended to limit the invention defined by the claims, and not all of the combinations of features described in the embodiments are mandatory for the problem-solving means of the invention. The present invention may be carried out in many different forms and should not be construed as limited to the contents of the embodiments set forth herein. The same components or elements are assigned the same reference numerals throughout the description of the embodiments.

Figure 1:
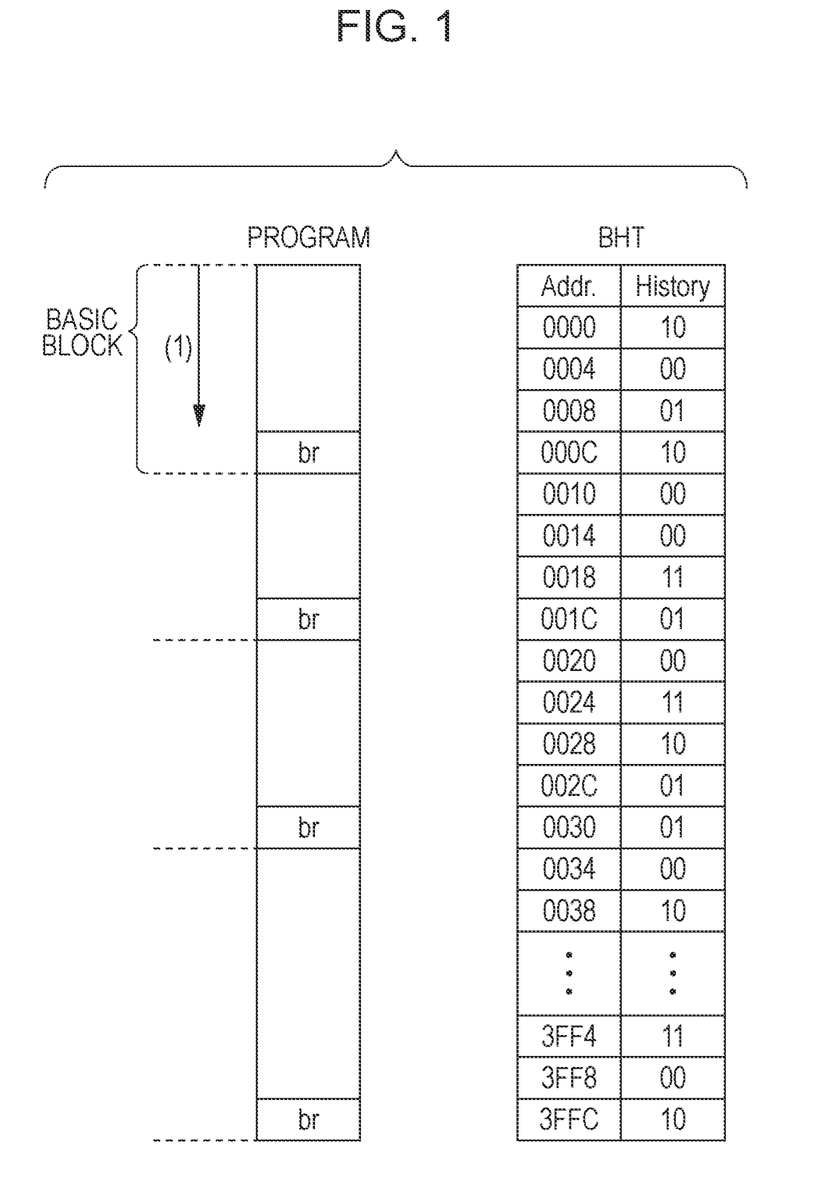
FIG. 1 is a schematic diagram illustrating an operation of a BHT.

First, an overview of an operation of a BHT used in a program analysis method according to one embodiment of the present invention will be described. As illustrated in FIG. 1, a program sequentially executes instructions in a first basic block (1) to reach a branch instruction denoted as "br". In each entry of the BHT, a history "History" represented by, for example, two bits is provided in association with an address "Addr." of an instruction.

Figure 2:
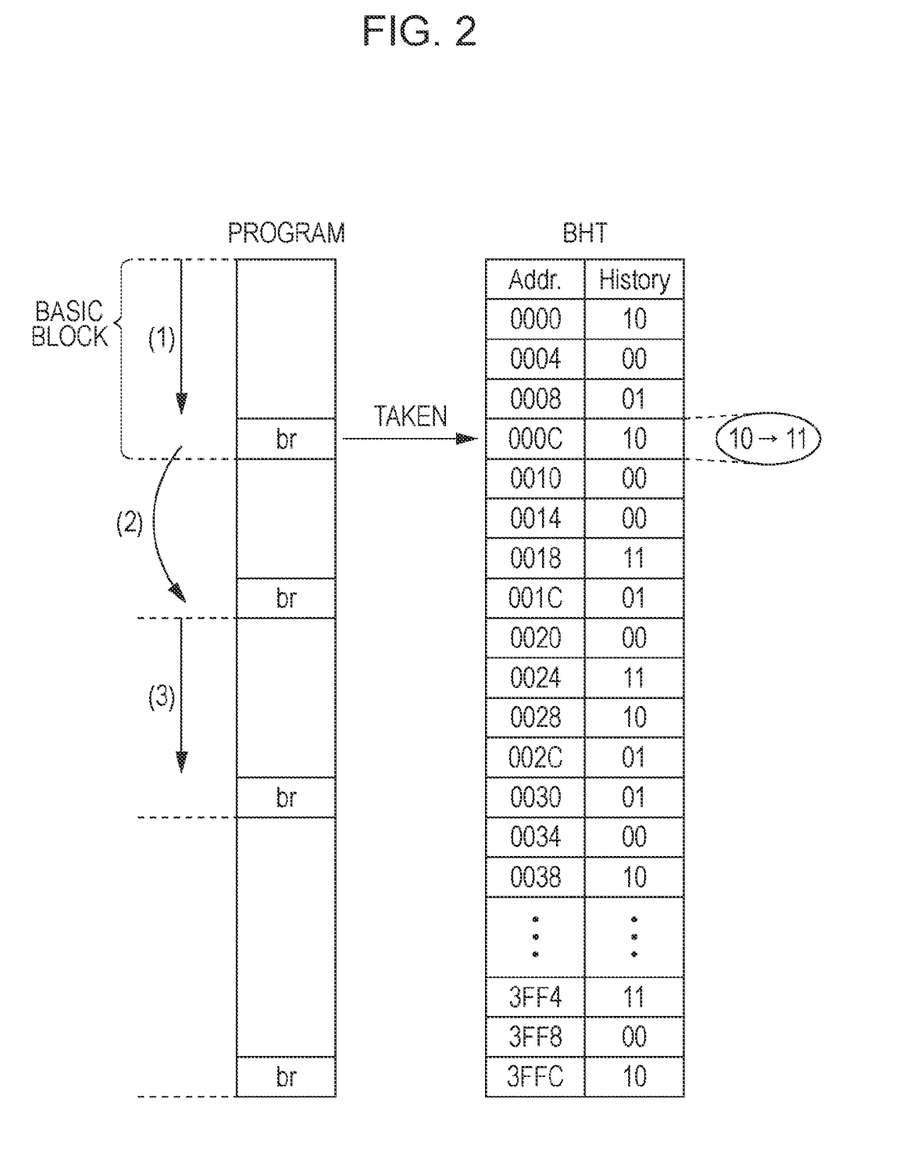
FIG. 2 is a schematic diagram illustrating an operation of a BHT.

As illustrated in FIG. 2, when the program jumps to a location immediately behind a branch instruction "br" in a second block (2) after executing the branch instruction "br" in the first block, the history bits for the address "Addr." of "000C" are incremented from 10 to 11 in the corresponding entry of the BHT since a branch of the branch instruction "br" in the first block is taken. Because the branch instruction "br" in the second block is not executed, the history bits of the corresponding entry of the BHT do not change. Then, the program sequentially executes instructions in a third block (3) to reach a branch instruction denoted as "br".

Figure 3:
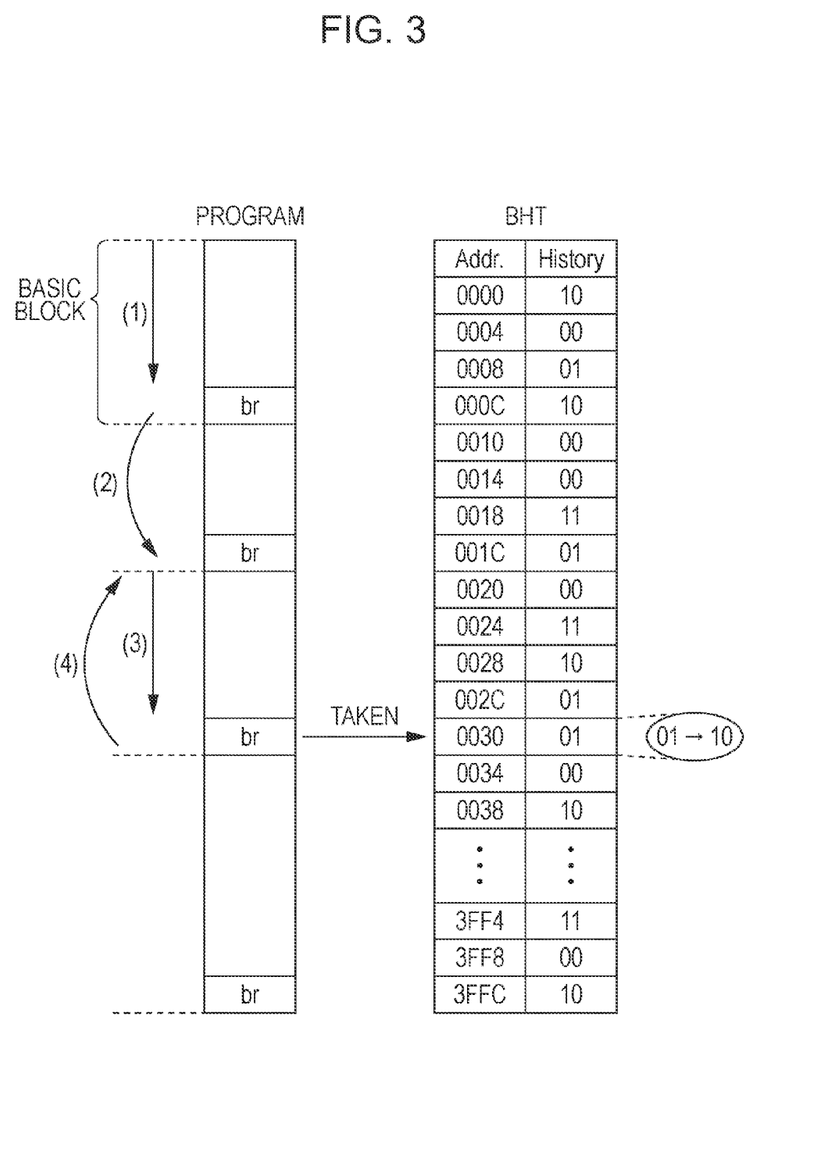
FIG. 3 is a schematic diagram illustrating an operation of a BHT.

As illustrated in FIG. 3, when the program jumps back to the location immediately behind the branch instruction "br" in the second block (4) after executing the branch instruction "br" in the third block, the history bits for the address "Addr."

of "0030" are incremented from 01 to 10 in the corresponding entry of the BHT since a branch of the branch instruction "br" in the third block is taken.

Figure 4:
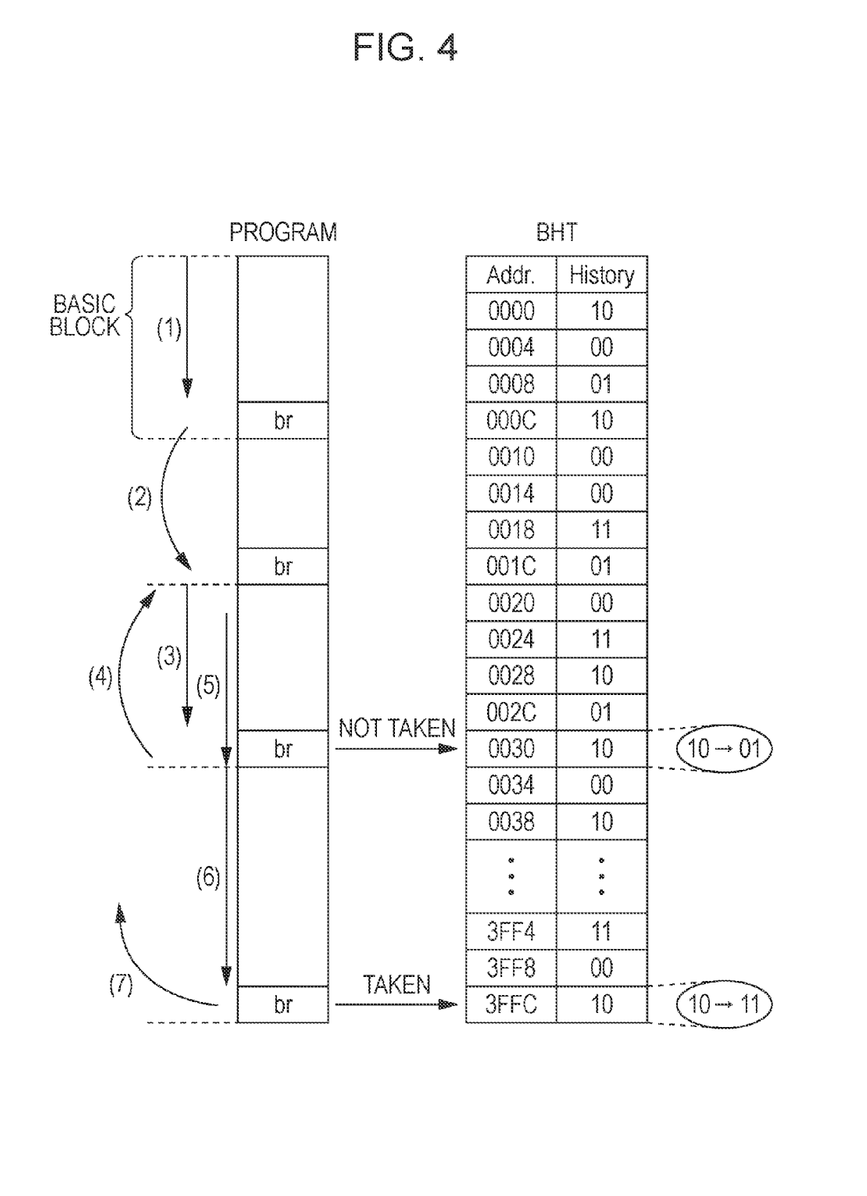
FIG. 4 is a schematic diagram illustrating an operation of a BHT.

As illustrated in FIG. 4, after the program jumps back to the location immediately behind the branch instruction "br" in the second block (4), the program sequentially executes the instructions in the third block again to reach the branch instruction denoted as "br" (5). This time, even if the branch instruction "br" in the third block is executed, the program does not jump. Thus, the branch is not taken. When the branch instruction "br" is executed but the branch is not taken, the history bits of the corresponding entry (for the address "Addr." of "0030") of the BHT are decremented from 10 to 01. After executing the branch instruction "br" in the third block, the program sequentially executes instructions in a fourth block (6) to reach a branch instruction denoted as "br". The program executes the branch instruction "br" in the fourth block to make a jump (7). Since a branch of the branch instruction "br" in the fourth block is taken, the history bits for the address "Addr." of "3FFC" are incremented from 10 to 11 in the corresponding entry of the BHT.

Figure 5:
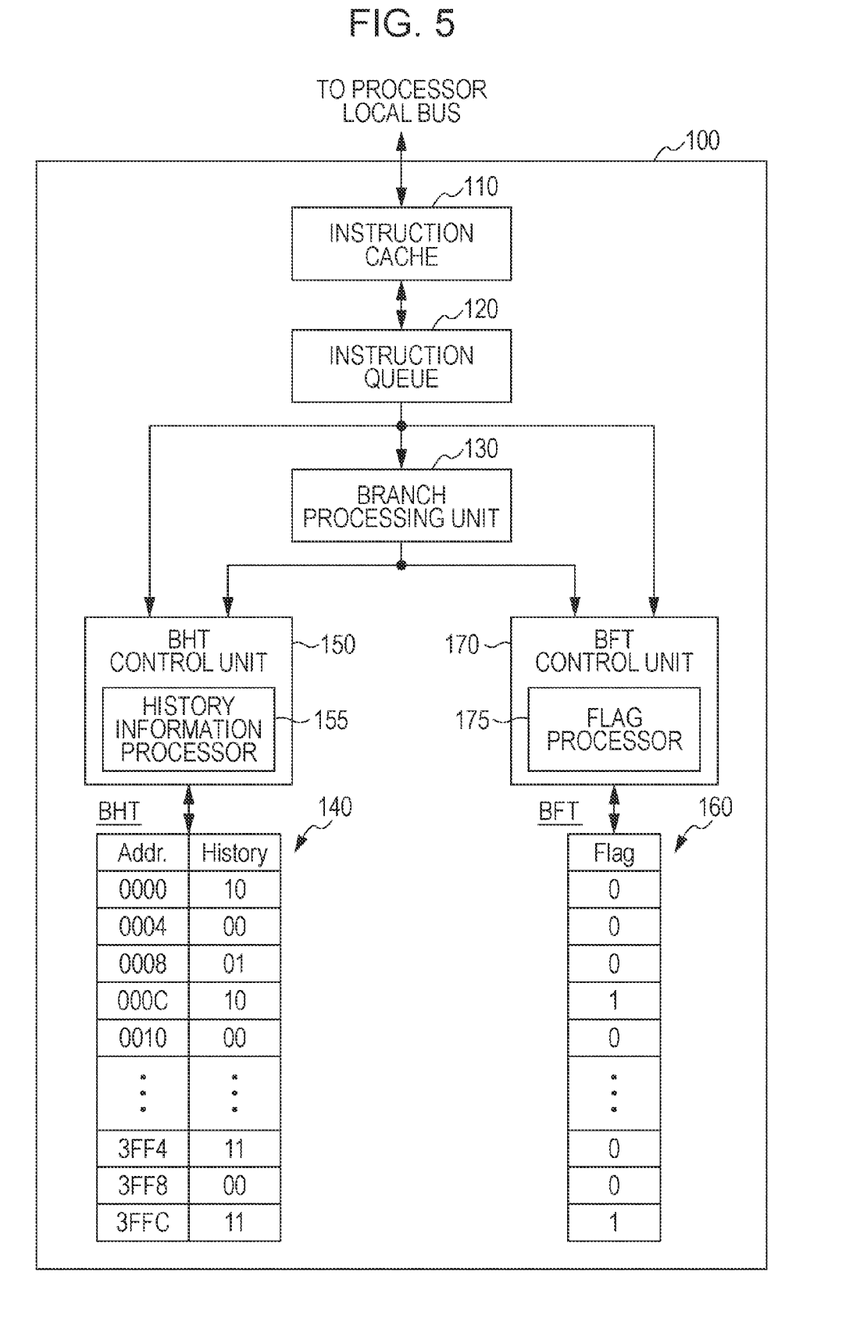
FIG. 5 is a block diagram schematically illustrating a processor including a system for analyzing a program according to one embodiment of the present invention.

FIG. 5 is a block diagram schematically illustrating a processor 100 including a program analysis system according to one embodiment of the present invention. The processor 100 includes an instruction cache 110 that holds instructions, an instruction queue 120 that stores instructions for execution, a branch processing unit 130 that processes branch instructions, a BHT 140, a BHT control unit 150 that controls the BHT 140, a branch flag table (hereinafter, abbreviated as "BFT") 160, and a BFT control unit 170 that controls the BFT 160. The branch processing unit 130 executes a branch instruction fetched from the instruction queue 120 and supplies the BHT control unit 150 and the BFT control unit 170 with information about whether a branch has been taken (or not).

The BHT control unit 150 includes a history information processor 155. In response to an instruction for starting program analysis, the history information processor 155 stores an initial state of the BHT 140 in a memory or a dedicated SRAM, not illustrated. Upon being supplied with information indicating that a branch has been taken from the branch processing unit 130 after a branch instruction is executed, the history information processor 155 increments the history bits of a corresponding entry, i.e., an entry having an address of the branch instruction, in the BHT 140. Upon being supplied with information indicating that the branch has not been taken from the branch processing unit 130, the history information processor 155 decrements the history bits of the corresponding entry in the BHT 140. Further, when execution of the branch instruction is skipped, the history information processor 155 does not change the history bits of the corresponding entry of the BHT 140.

The BFT 160 includes, for each instruction, a one-bit flag (Flag), for example. The flag is set to "1 (enabled)" or "0 (disabled)". Alternatively, the opposite values may be set for the flag bit. The BFT control unit 170 includes a flag processor 175. In response to an instruction for starting program analysis, the flag processor 175 initializes the flags of the BFT 160, i.e., sets the flags to "0 (disabled)". Upon being supplied with information indicating that a branch has been taken from the branch processing unit 130 after a branch instruction is executed, the flag processor 175 determines whether the corresponding flag of the BFT 160, i.e., the flag corresponding to the branch instruction, is "enabled" or "disabled". If the flag is "disabled", the flag processor 175 sets the flag bit to "1 (enabled)". Upon receiving information indicating that the branch has not been taken from the branch processing unit 130, the flag processor 175 maintains the set state of the corresponding flag of the BFT 160. Further, the flag processor 175 maintains the flag bit that has been set to be enabled during program analysis. That is, once the flag is set to be enabled, the flag processor 175 does not change the enable setting during the program analysis.

In FIG. 5, the BFT 160 and the BFT control unit 170 are provided independently from the BHT 140 and the BHT control unit 150, respectively. However, the function of the BFT 160 may be included in the BHT 140 by configuring the BHT 140 using a following table. The table includes a field, other than the address field "Addr." of each entry that is longer than two bits. The least significant bit of the field is provided as a flag part of the BFT 160. In such a case, the function of the BFT control unit 170 is also included in the BHT control unit 150. As a result, the BHT control unit 150 has the function of the flag processor 175 besides the function of the history information processor 155.

Figure 6:
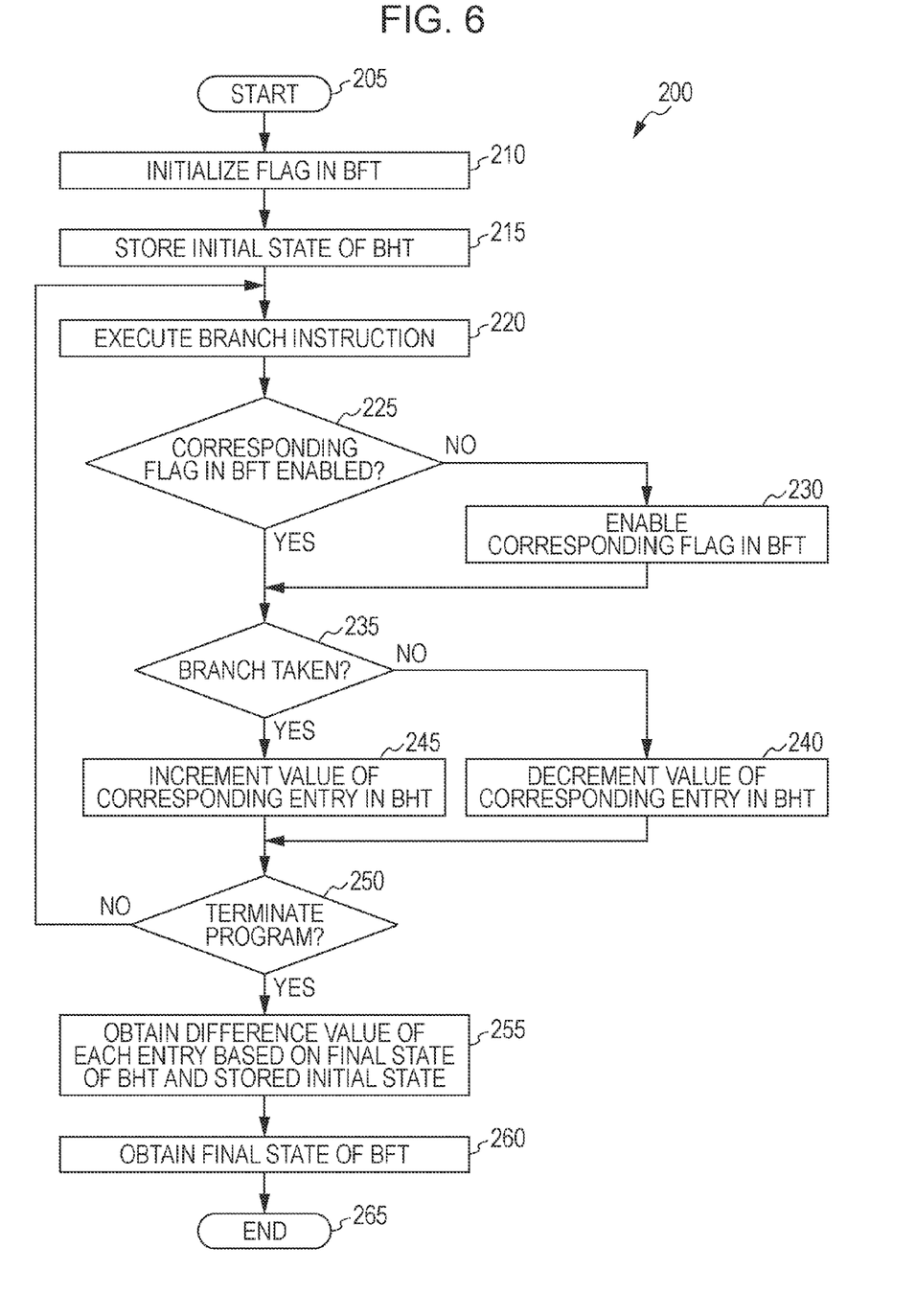
FIG. 6 is a flowchart schematically illustrating a program analysis method according to one embodiment of the present invention.

FIG. 6 is a flowchart (200) schematically illustrating a program analysis method according to one embodiment of the present invention. This method can be performed by the processor 100 including the program analysis system illustrated in FIG. 5. Once the processor 100 receives an instruction for starting program analysis from the instruction queue 120, the process starts (step 205). The processor 100 initializes the flags in the BFT 160, i.e., sets the flags to "0 (disabled)" (step 210). The processor 100 also stores an initial state of the BHT 140 in a memory or a dedicated SRAM, not illustrated (step 215).

Thereafter, the processor 100 executes a branch instruction of a program (step 220) and then determines whether or not the corresponding flag in the BFT 160, i.e., the flag corresponding to the branch instruction, is set to "1 (enabled)" (step 225). If the determination indicates "NO", i.e., if the corresponding flag is not enabled, the processor 100 sets the flag to be enabled (i.e., sets the bit thereof to "1") (step 230). The process then proceeds to step 235. If the determination indicates "YES", i.e., if the corresponding flag is enabled, the process also proceeds to step 235. The processor 100 determines whether a branch has been taken (or not) in execution of the branch instruction (step 235). If the determination indicates "NO", i.e., if the branch has not been taken, the processor 100 decrements the history bits of the corresponding entry, i.e., an entry having an address of the branch instruction, in the BHT 140 (step 240). The process then proceeds to step 250. If the determination indicates "YES", i.e., if the branch has been taken, the processor 100 increments the history bits of the corresponding entry in the BHT 140 (step 245). The process then proceeds to step 250.

In step 250, the processor 100 determines whether or not to terminate the program subjected to the analysis. If the determination indicates "NO", i.e., if the program is not terminated but is continued, the process returns to step 220, and step 220 to step 250 are repeated. If the determination indicates "YES", i.e., if the program is terminated, the process proceeds to step 255. The processor 100 obtains a differential value of each entry (the history bits) between a final state and the stored initial state of the BHT 140 (step 255). The processor 100 further obtains a final state of the BFT 160 (step 260). The process then terminates (step 265). The obtained differential value of each entry (the history bits) of the BHT 140 and the obtained final state of the BFT 160 may be stored in a memory and so forth or may be provided to a user by displaying information on a display device, not illustrated.

Figure 7:
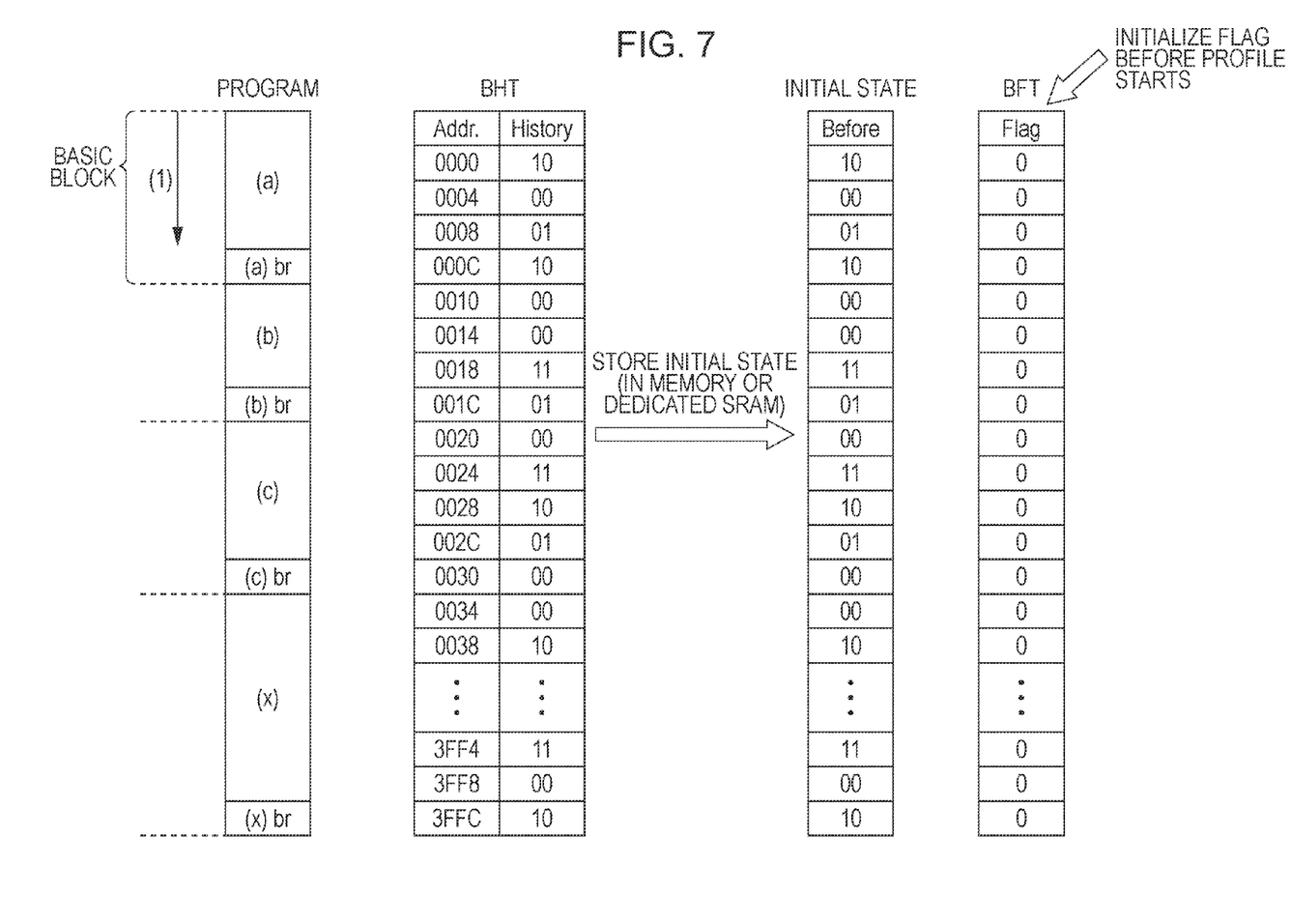
FIG. 7 is a schematic diagram illustrating a BHT and a BFT when execution of a program analysis method according to one embodiment of the present invention is started.
Figure 8:
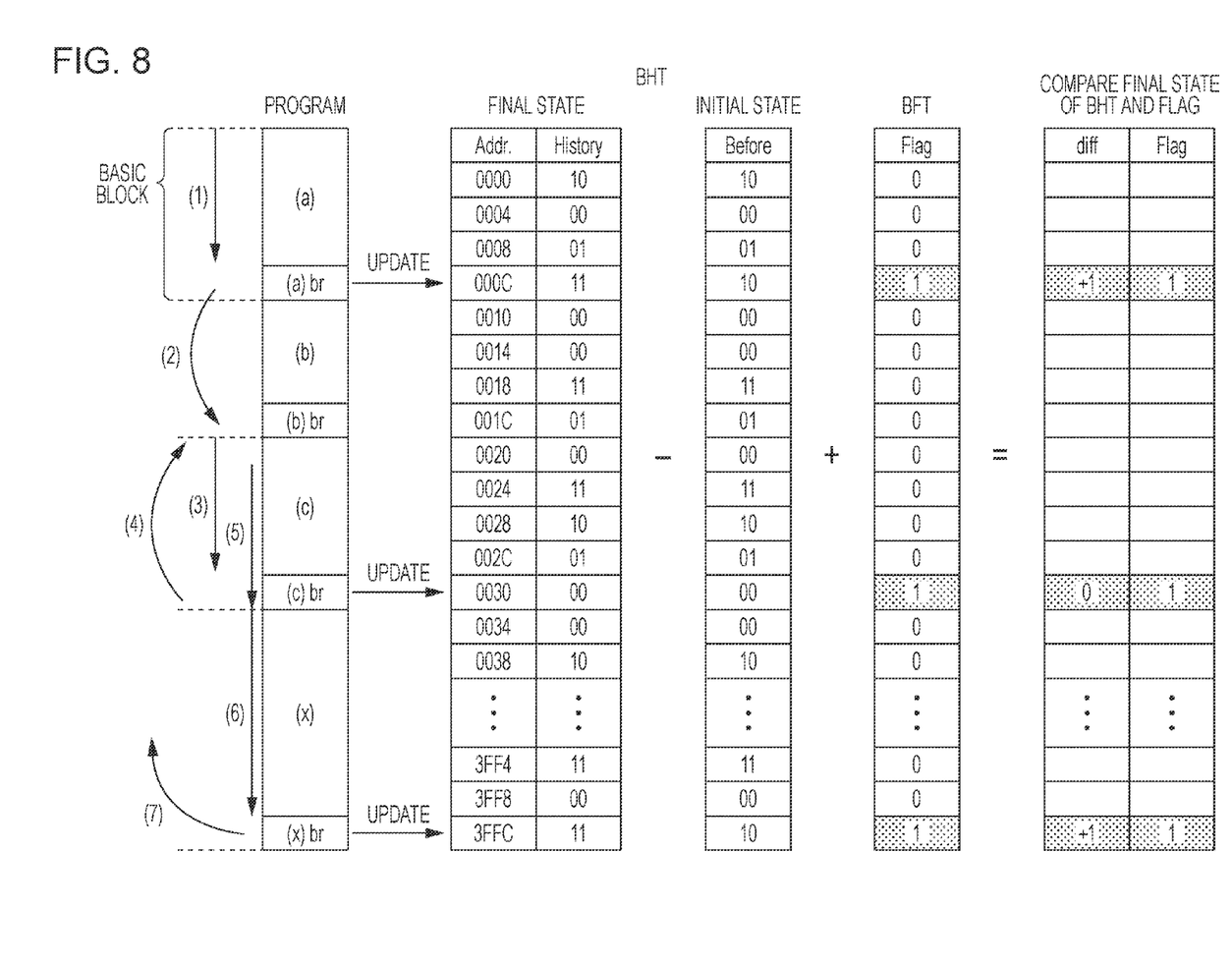
FIG. 8 is a schematic diagram illustrating a BHT and a BFT when execution of a program analysis method according to one embodiment of the present invention is terminated.

FIG. 7 and FIG. 8 illustrate the BHT and the BFT before and after execution of a program analysis method according to one embodiment of the present invention starts and terminates, respectively, using the examples illustrated in FIG. 1 to FIG. 4. FIG. 7 illustrates data of the BHT and the BFT before profiling, i.e., program analysis, starts. The initial state of the BHT is stored in a memory or a dedicated SRAM, not illustrated. All flags in the BFT are initialized, i.e., set to "0 (disabled)". A program is executed from a basic block (a) (1).

FIG. 8 illustrates data of the BHT and the BFT after profiling, i.e., program analysis, terminates. The program executes a branch instruction (a)br in the portion (a) to jump to a portion (c) (2). The program then executes the portion (c) (3). Thereafter, the program executes a branch instruction (c)br in the portion (c) to make a jump to a head of the portion (c) (4). The program again executes the portion (c) (5). This time, the program executes the branch instruction (c)br in the portion (c) but the branch is not taken. The program executes a portion (x) (6). The program then executes a branch instruction (x)br in the portion (x) to make a jump (7). Every time a branch instruction is executed, the history bits of the corresponding entry of the BHT are updated. A difference "diff" between data of a final state of the BHT and data of the initial state stored at the time of start is determined. Additionally, when each branch instruction has been executed and a branch has been taken, the bit of the corresponding flag of the BFT is set to "1 (enabled)". The difference data "diff" of the BHT and the final flag data of the BFT can be obtained by performing the program analysis method according to the embodiment of the present invention.

Figure 9:
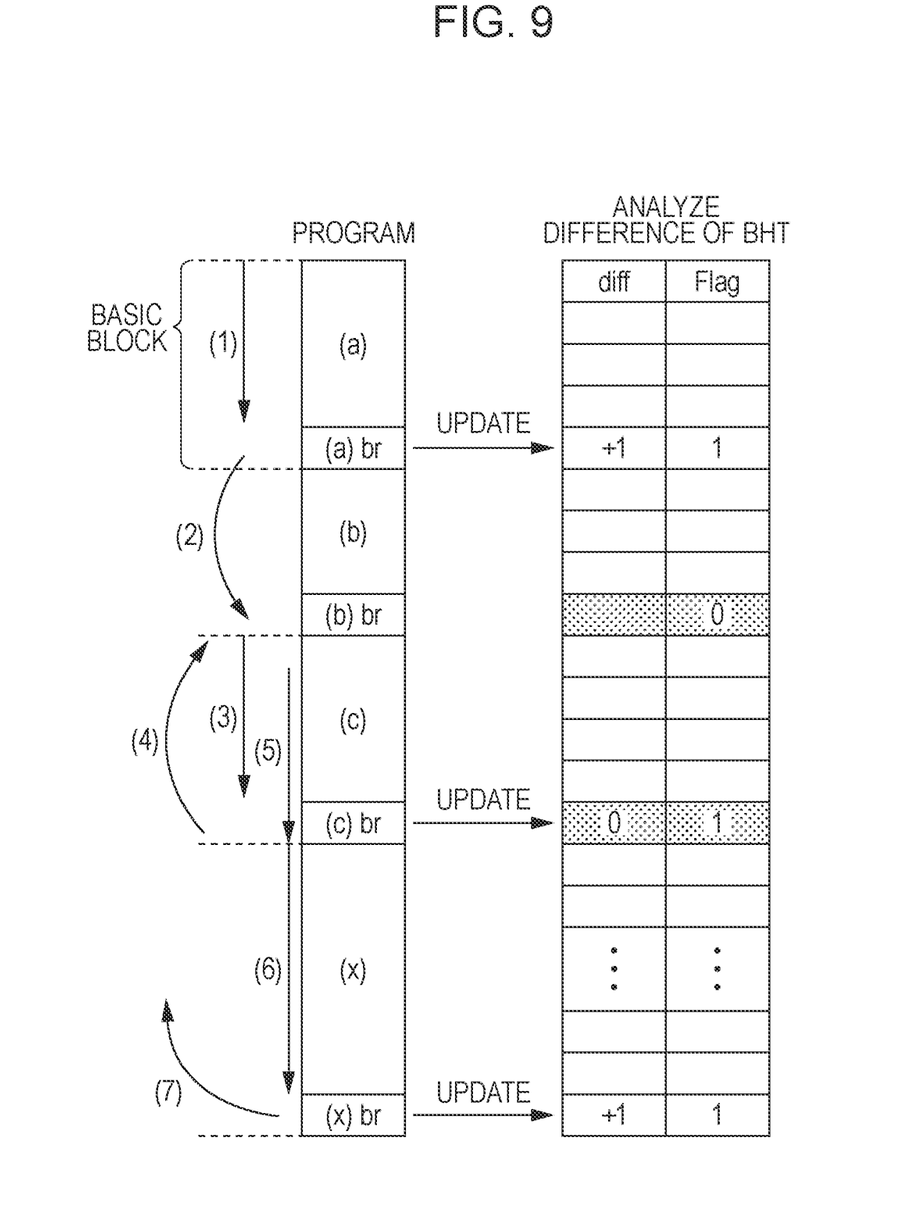
FIG. 9 is a schematic diagram illustrating data obtained by executing a program analysis method according to one embodiment of the present invention.

FIG. 9 illustrates the action of the program subjected to analysis, the obtained difference data "diff" of the BHT, and the final flag data "Flag" of the BFT. Based on these pieces of obtained data, the following analysis can be made for the program.

Since the difference data "diff" is "+1" and the flag data "Flag" is "1" regarding the branch instruction (a)br, codes in the portion (a) have been executed and the branch of the branch instruction (a)br has been taken.

Since the flag data "Flag" is "0" regarding the branch instruction (b)br, codes in the portion (b) have not been executed.

Since the difference data "diff" is "0" and the flag data "Flag" is "1" regarding the branch instruction (c)br, codes in the portion (c) have been executed and the branch of the branch instruction (c)br has been taken. The branch has not been taken at least once.

Since the difference data "diff" is "+1" and the flag data "Flag" is "1" regarding the branch instruction (x)br, codes in the portion (x) have been executed and the branch of the branch instruction (x)br has been taken at least once.

Figure 10:
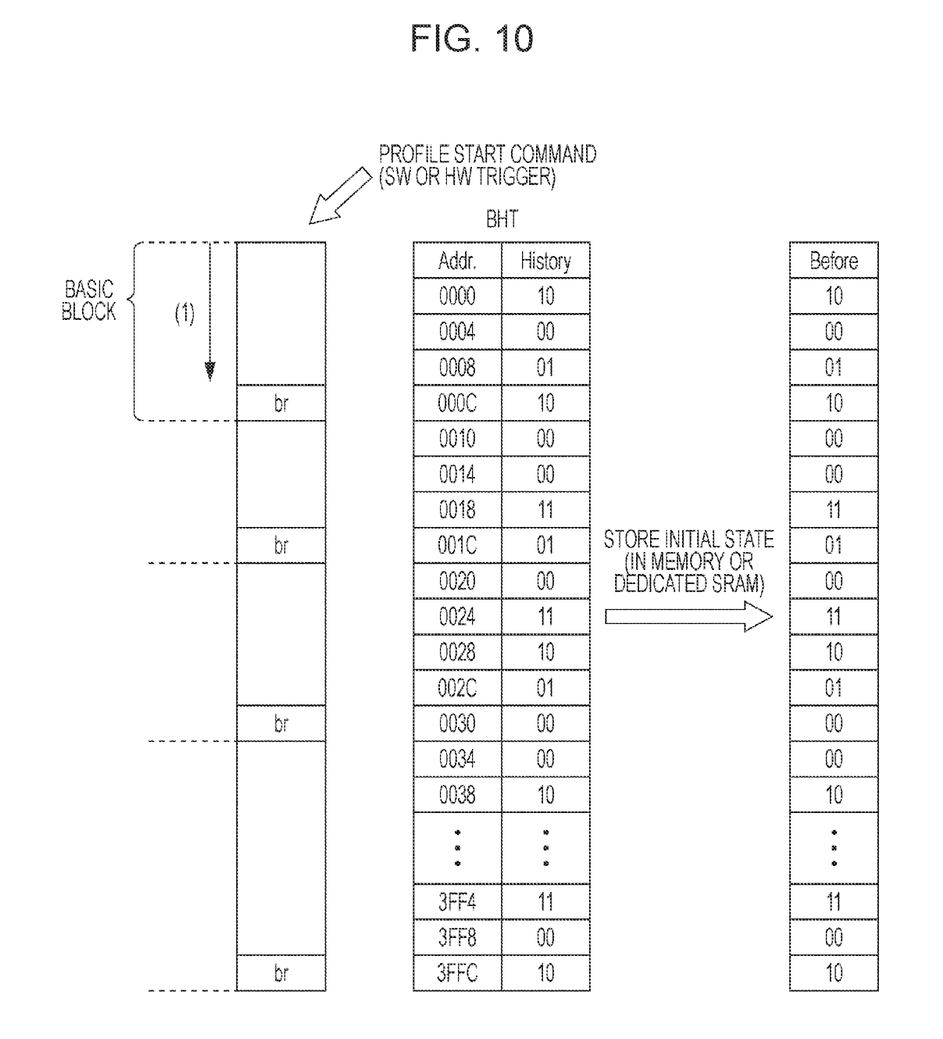
FIG. 10 is a schematic diagram illustrating a BHT when program analysis based only on a BHT is started.
Figure 11:
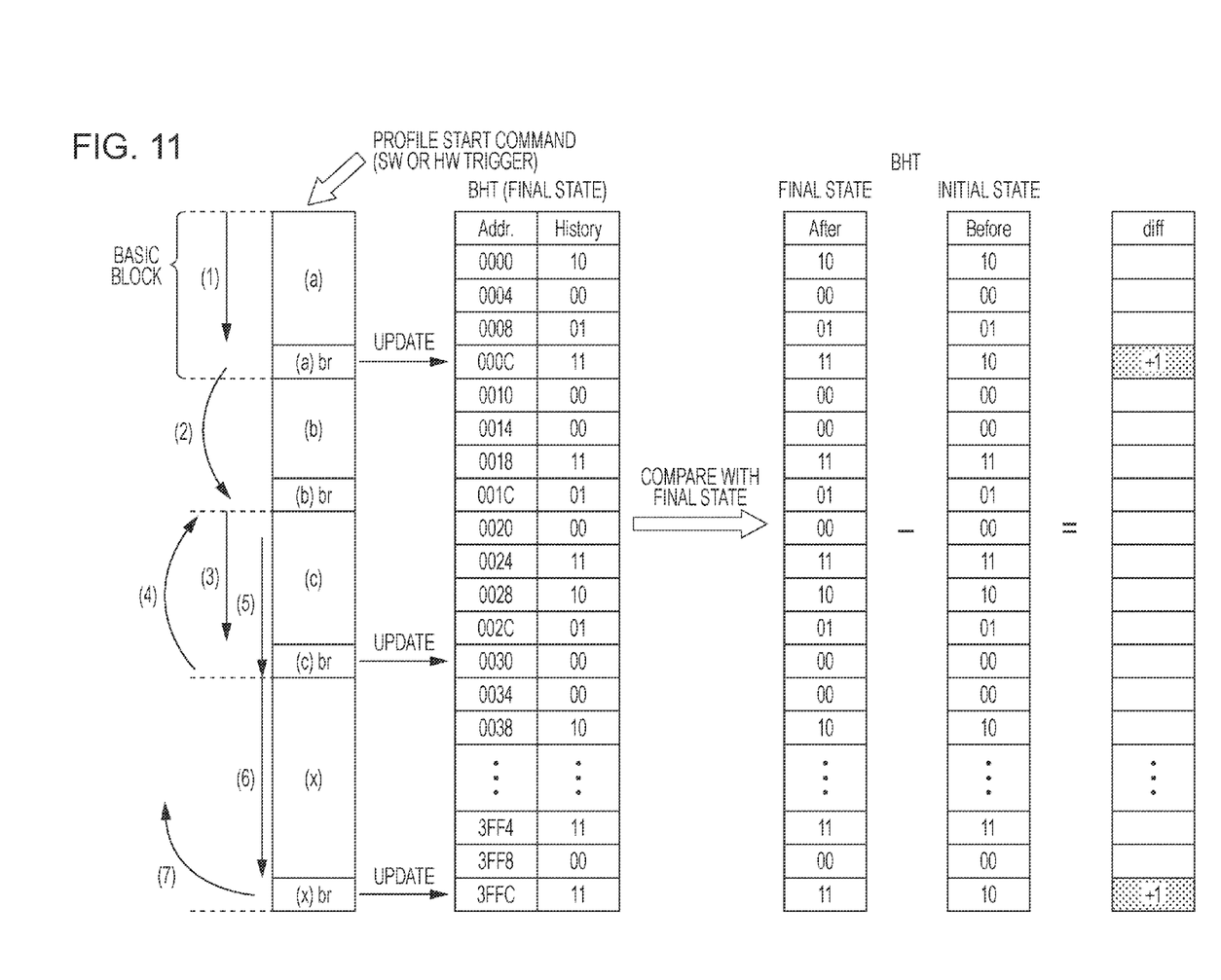
FIG. 11 is a schematic diagram illustrating a BHT when program analysis based only on a BHT is terminated.
Figure 12:
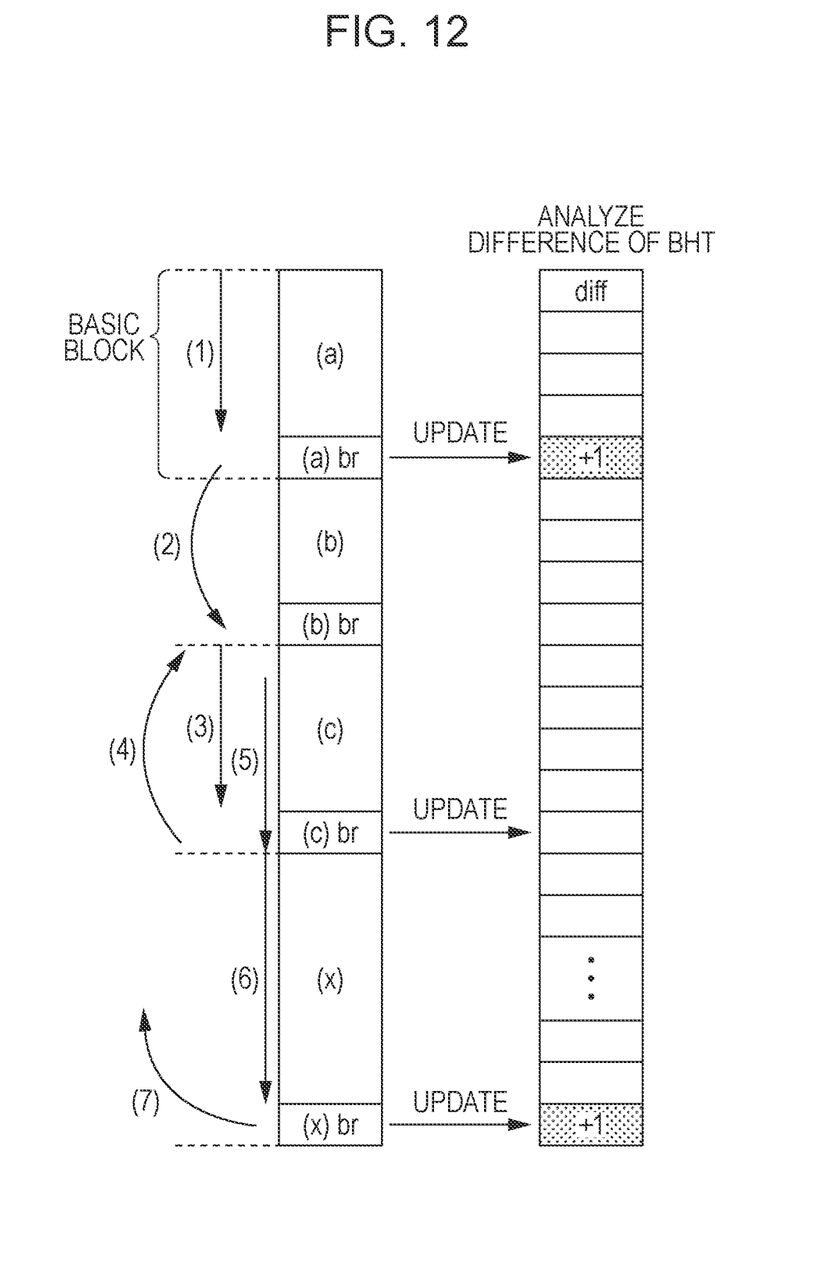
FIG. 12 is a schematic diagram illustrating data obtained by program analysis based only on a BHT.

For reference, FIG. 10 to FIG. 12 illustrate results that can be analyzed from data obtained by program analysis based only on a BHT (history bits of each entry). FIG. 10 illustrates data of the BHT before profiling starts. FIG. 10 corresponds to FIG. 7 but the data of the BFT illustrated in FIG. 7 does not exist. Similarly, FIG. 11 illustrates data of the BHT after profiling terminates. FIG. 11 also corresponds to FIG. 8 but the data of the BFT illustrated in FIG. 8 does not exist. Only the difference data "diff" of the BHT is obtained.

FIG. 12 illustrates the action of the program to be analyzed and the obtained diff data "diff" of the BHT. The following analysis can be made for the program from this obtained data.

Since the difference data "diff" is "+1" regarding the branch instruction (a)br, the codes in the portion (a) have been executed and the branch of the branch instruction (a)br has been taken.

Since the difference data "diff" is "+1" regarding the branch instruction (x)br, the codes in the portion (x) have been executed and the branch of the branch instruction (x)br has been taken.

As described above, in the program analysis based only on the BHT (history bits of each entry), whether or not the codes in the portion (b) are executed is unknown. Additionally, whether or not the codes in the portion (c) are executed is also unknown despite the fact that the codes in the portion (c) are actually executed. However, as described before, those problems are solved by providing a BFT and by setting each flag to be enabled when a corresponding branch is taken as in the present invention.

Figure 13:
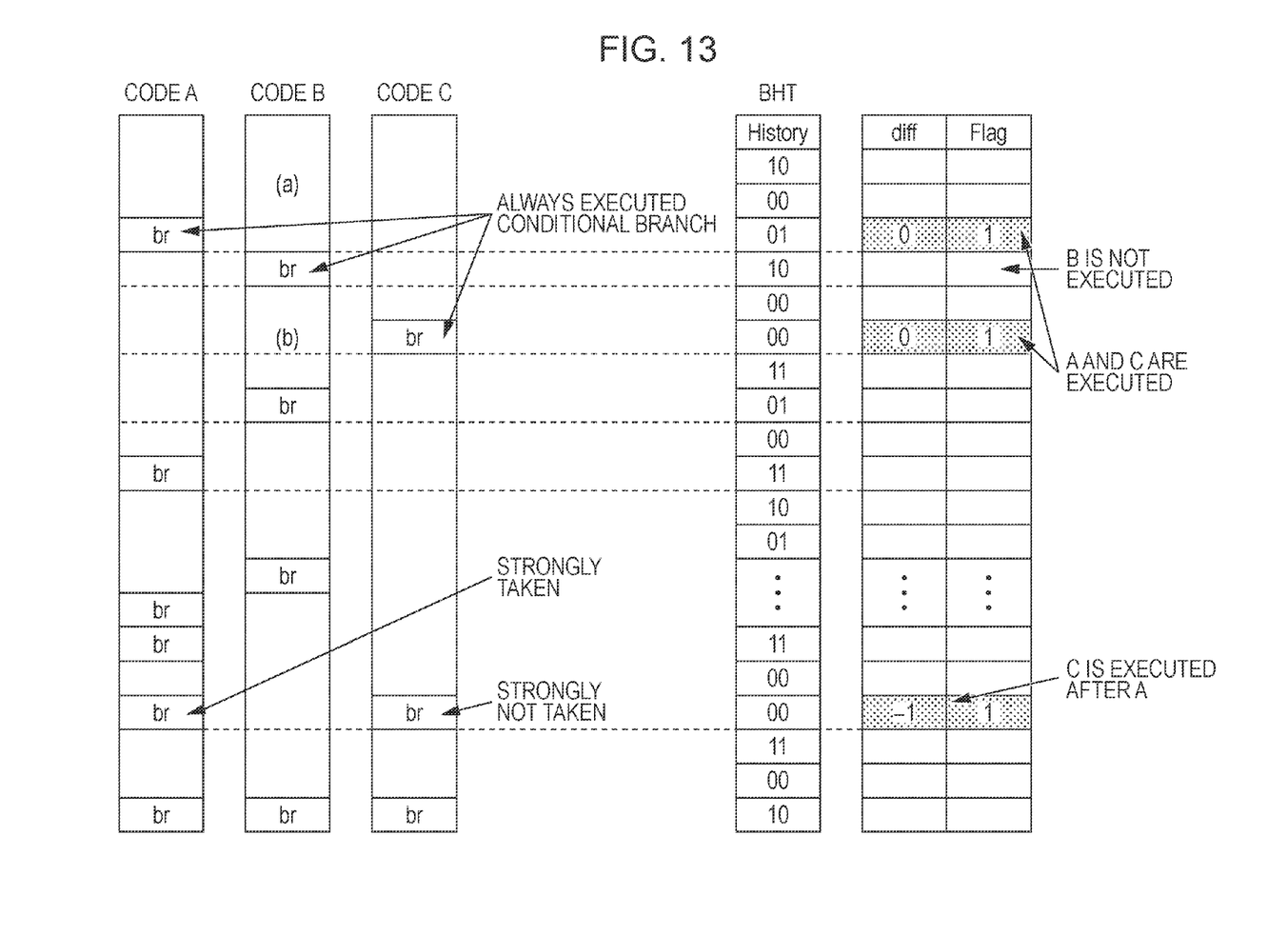
FIG. 13 is a schematic diagram illustrating another data obtained by executing a program analysis method according to one embodiment of the present invention.

FIG. 13 is a schematic diagram illustrating another data obtained by performing a program analysis method according to one embodiment of the present invention. In an example of FIG. 13, profiles, such as presence or absence of branch instructions unique to a program and a branching probability, are obtained in advance. As illustrated in FIG. 13, it is known that first branch instructions "br" of codes A, B, and C are conditional branches that are always executed, a last branch instruction "br" of the code A is strongly taken, and a last branch instruction "br" of the code C is strongly not taken. Behavior of the program can be analyzed by associating these pieces of profile information with the obtained difference data "diff" of the BHT and the obtained flag data of the BFT. Particularly, the following can be analyzed.

Since the difference data "diff" is "0" and the flag data "Flag" is "1" regarding the first branch instructions "br" of the codes A and C, the code A and C have been executed and the conditional branches thereof that are always executed have been taken.

Since the difference data "diff" is blank (not updated) and the flag data "Flag" is blank ("0") regarding the first branch instruction "br" of the code B, the code B has not been executed.

Since it is confirmed that the code A has been executed and the difference data "diff" is "−1" and the flag data "Flag" is "1" regarding the last branch instructions "br" of the codes A and C, it is collectively determined that the branch instruction "br" of the code A that is strongly taken has been executed and then the branch instruction "br" of the code C that is strongly not taken has been executed.

The present invention has been described above using the embodiments. However, the technical scope of the present invention is not limited to the scope described for the embodiments. Various modifications or improvements can be added to the embodiments, and the modes to which such modifications or improvements are added are also included in the technical scope of the present invention.

What is claimed is:

1. A method for analyzing a program, the method comprising the steps, executed by a processor, of:
initializing, upon start of the program, a plurality of flags included in a first table to a disabled state, each of the plurality of flags corresponding to an instruction of the program;
storing, upon start of the program, an initial state of a second table that includes a plurality of entries each corresponding to an instruction of the program and that holds history information in each of the plurality of entries;
determining, upon execution of a branch instruction, whether or not a branch has been taken;

responsive to the branch not being taken, decrementing a value of the history information of a corresponding entry of the second table;

responsive to the branch being taken, incrementing a value of the history information of a corresponding entry of the second table;

determining whether a corresponding flag of the first table is enabled or disabled;

responsive to the branch being taken, enabling, when the corresponding flag is disabled, the corresponding flag in the first table;

responsive to the branch not being taken, leaving the corresponding flag in the first table unchanged;

determining whether or not to terminate the program;

responsive to the program not terminating, repeating the step of determining whether or not a branch has been taken to the step of determining whether or not to terminate the program;

responsive to the program terminating, obtaining a differential history information value of each entry between the stored initial state and a final state of the second table;

responsive to the program terminating, obtaining a final state of each flag of the first table; and comparing the differential history value of the second table and the final state of the plurality of flags of the first table to determine if a branch was taken by the corresponding flag being enabled and, if the branch was taken, how many times the branch was taken and how many times the branch was skipped.

2. The method according to claim 1, wherein the flag is a flag bit, and wherein the step of initializing the plurality of flags to the disabled state includes setting the flag bit to zero, and wherein the step of enabling the corresponding flag includes setting the flag bit to one.

3. The method according to claim 1, wherein the history information is composed of a plurality of bits, and wherein the second table functions as the first table by using a least significant bit of the plurality of bits as the flag, wherein the step of initializing the plurality of flags to the disabled state includes setting the least significant bit to zero, and wherein the step of enabling the corresponding flag includes setting the least significant bit to one.

4. The method according to claim 1 wherein a branch history table is used as the second table.

5. The method according to claim 2 wherein a branch history table is used as the second table.

6. The method according to claim 3 wherein a branch history table is used as the second table.

7. A non-transitory computer readable storage medium storing a computer program for analyzing a program, the computer program causing a processor to execute each step of the method according to claim 1.

8. A non-transitory computer readable storage medium storing a computer program for analyzing a program, the computer program causing a processor to execute each step of the method according to claim 2.

9. A non-transitory computer readable storage medium storing a computer program for analyzing a program, the computer program causing a processor to execute each step of the method according to claim 3.

10. A non-transitory computer readable storage medium storing a computer program for analyzing a program, the computer program causing a processor to execute each step of the method according to claim 4.

11. A computer system for analyzing a program, the computer system comprising one or more computer processors, one or more hardware computer-readable storage media, and program instructions stored on one or more of the hardware computer-readable storage media for execution by at least one of the one or more processors, including:

a first table that includes a plurality of flags, wherein each flag is one or more bits corresponding to a branch instruction of the program;

a first table control unit that controls the first table;

a second table that includes a plurality of entries, wherein each entry is one or more bits corresponding to a branch instruction of the program, and that holds history information in each of the plurality of entries;

a second table control unit that controls the second table; and a branch processing unit that processes the branch instruction and that supplies the first table control unit and the second table control unit with information about whether or not a branch has been taken, wherein the first table control unit includes a flag processor that initializes, upon start of the program, the plurality of flags to a disabled state, that determines, upon being supplied with information indicating that the branch has been taken from the branch processing unit, whether a corresponding flag is enabled or disabled, that enables, when the corresponding flag is disabled, the corresponding flag, and that supplies, upon termination of the program, the processor with a final state of each flag of the first table, and wherein the second table control unit includes a history information processor that stores, upon start of the program, an initial state of the history information of each entry in a memory or dedicated static random-access memory (SRAM), that decrements, upon being supplied with information indicating that the branch has not been taken from the branch processing unit, a value of the history information of a corresponding entry, that increments, upon being supplied with information indicating that the branch has been taken from the branch processing unit, a value of the history information of a corresponding entry, and that supplies, upon termination of the program, the processor with a differential history information value of each entry between the stored initial state and a final state of the history information of the entry, and wherein the processor stores the differential history information value of each entry in the second table and the final state of each flag in the first table in a memory and compares the differential history information to determine if a branch was taken by the corresponding flag being enabled and, if the branch was taken, how many times the branch was taken and how many times the branch was skipped.

12. The system according to claim 11, wherein the flag is a flag bit, and wherein the flag processor initializes the flag to the disabled state by setting the flag bit to zero and enables the flag by setting the flag bit to one.

13. The system according to claim 11, wherein the flag is a flag bit, and wherein the flag processor initializes the flag to the disabled state by setting the flag bit to zero and enables the flag by setting the flag bit to one.

14. The system according to claim 11, wherein the flag is a flag bit, and wherein the flag processor initializes the flag to the disabled state by setting the flag bit to zero and enables the flag by setting the flag bit to one.

15. The system according to claim 12, wherein the flag is a flag bit, and wherein the flag processor initializes the flag to the disabled state by setting the flag bit to zero and enables the flag by setting the flag bit to one.

16. The system according to claim 13, wherein the flag is a flag bit, and wherein the flag processor initializes the flag to the disabled state by setting the flag bit to zero and enables the flag by setting the flag bit to one.

\* \* \* \* \*